(12) United States Patent
Gnauert et al.

(10) Patent No.: US 6,764,086 B2
(45) Date of Patent: Jul. 20, 2004

(54) MOTOR VEHICLE, ESPECIALLY CONVERTIBLE, INCLUDING ACTIVELY CONTROLLED TORSION STABILIZERS

(75) Inventors: Uwe Gnauert, Göttingen (DE); Heinrich Fehren, Kassel (DE); Daniel Kohlrautz, Duderstadt (DE); Hubertus Siebald, Rosdorf (DE); Roger Wimmel, Rosdorf (DE)

(73) Assignee: ERAS Entwicklung and Realisation adaptiver Systeme GmbH (DE)

( * ) Notice: Subject to any disclaimer, the term of this patent is extended or adjusted under 35 U.S.C. 154(b) by 108 days.

(21) Appl. No.: 10/055,250

(22) Filed: Jan. 23, 2002

(65) Prior Publication Data
US 2002/0096853 A1 Jul. 25, 2002

(30) Foreign Application Priority Data
Jan. 23, 2001 (DE) .......................... 101 02 910

(51) Int. Cl.[7] ................................................ B60G 3/18
(52) U.S. Cl. ..................... 280/124.137; 280/124.152; 180/89.1
(58) Field of Search ........................... 296/186, 187.01; 180/89.1; 280/124.152, 124.137

(56) References Cited
U.S. PATENT DOCUMENTS

| 3,645,173 A | 2/1972 | Yarlott | |
|---|---|---|---|
| 5,154,442 A | * 10/1992 | Milliken | 280/5.507 |
| 5,288,101 A | * 2/1994 | Minnett | 280/5.511 |
| 5,839,741 A | * 11/1998 | Heyring | 280/124.106 |
| 6,206,460 B1 | * 3/2001 | Seeliger et al. | 296/204 |
| 2003/0111816 A1 | * 6/2003 | Carlstedt et al. | 280/124.152 |

FOREIGN PATENT DOCUMENTS

| EP | 0146261 B1 | 4/1988 |
|---|---|---|
| EP | 0161750 B1 | 10/1988 |
| EP | 0955228 A2 | 11/1999 |
| GB | 1331756 | 9/1973 |
| WO | 00/61951 | 10/2000 |
| WO | 00/61952 | 10/2000 |

* cited by examiner

*Primary Examiner*—Paul N. Dickson
*Assistant Examiner*—Toan C To
(74) *Attorney, Agent, or Firm*—Thomas, Kayden, Horstemeyer & Risley, LLP

(57) ABSTRACT

A motor vehicle, especially a convertible, includes a torsion stabilizer unit including a hydraulic actuator unit. The hydraulic actuator unit may be designed as a flexible hose actuator unit or tube actuator unit through which a hydraulic medium flows. The motor vehicle further includes a control unit to actively control the length of the hose actuator unit to counteract sensed torsion of the body of the motor vehicle.

30 Claims, 1 Drawing Sheet

MOTOR VEHICLE, ESPECIALLY CONVERTIBLE, INCLUDING ACTIVELY CONTROLLED TORSION STABILIZERS

CROSS REFERENCE TO RELATED APPLICATIONS

This application claims the benefit of co-pending German Patent Application No. 101 02 910.1-42 entitled "Kraftfahrzeug, insbesondere Cabrio, mit aktiv angesteuerten Torsionsstabilisatoren", filed on Jan. 23, 2001.

FIELD OF THE INVENTION

The present invention generally relates to a motor vehicle. More particularly, the present invention relates to a convertible including at least one torsion stabilizer unit being actively controlled to change its length to counteract vibration of the body of the convertible.

BACKGROUND OF THE INVENTION

It is known in the art that a variety of motor vehicles, especially convertibles, have a body which is not stiff against torsion. Consequently, torsion vibrations of the body of the motor vehicle quickly occur due to an excitation caused by rough, bumpy, or uneven pavements or roads. In case of convertibles, reduced torsion strength is caused by the fact that the stiffness of the body of the convertible is reduced due to the missing fixed top compared to sedans and the like. In convertibles, there also are significant bending vibrations about a transverse axis of the motor vehicle being located in the region of the openings of the doors. The torsion vibrations occur about the longitudinal axis of the motor vehicle corresponding to the direction of motion of the vehicle.

A motor vehicle is known from European Patent Application No. 0 955 228 A2. The known motor vehicle, especially a convertible, includes a body to which struts extending in a longitudinal direction are associated as torsion stabilizers. In another embodiment, two of the struts are designed to be variable in length. Watching units for determining a longitudinal load, control elements for effecting an opposing counterforce, and a control unit for controlling the control elements are associated with the struts. The control elements in the only constructive embodiment are designed as piezo elements which may also be described as potential/pressure converters. In each case, the torsion stabilizers being variable in length as known from European Patent Application No. 0 955 228 A2 are designed and arranged to absorb compressive stresses. In practical operation, it has been found that piezo elements are only capable of effecting the necessary variation in length of the struts to substantially stabilize the body of a motor vehicle at great expense. For this purpose, very high electrical potential has to be used at the piezo elements. In this way, torsion in a dynamic region—meaning torsion vibrations—of the respective motor vehicle may be substantially suppressed. However, static torsion of the motor vehicle—for example due to a rough surface on which the motor vehicle is supported—cannot be prevented. Such static torsion results in deformation of the openings of the doors, for example. Consequently, there are problems during opening and closing the doors of the convertible.

A hose actuator is known from British Patent No. 1 331 756. The hose actuator expands its diameter when hydraulic medium flows into its interior. Consequently, the length of the hose actuator between its connecting locations or supporting locations is shortened. The increase in diameter mainly occurs in the middle region between the connecting locations of the hose actuator. The pressure prevailing in the interior of the actuator is transformed into an increase in diameter and into a simultaneous decrease of length being achieved by expansion-prove supports in combination with an elastic wall of the hose actuator.

Further developments concerning the hose actuator known from British Patent No. 1 331 756 are disclosed in the following patent documents: EP 0 146 261 B1, EP 0 161 750 B1, WO 00/61951, WO 00/61952, DE 195 31 097 C2, and DE 199 17 483 A1. The known applications of known hose actuators are in the quasi-static region, meaning the low frequency region.

SUMMARY OF THE INVENTION

The present invention relates to a motor vehicle including at least one torsion stabilizer unit having a length and including at least one hydraulic actuator unit. The motor vehicle further includes at least one control unit being designed and arranged to actively control the length of the at least one torsion stabilizer unit. More particularly, the present invention relates to a convertible.

The present invention also relates to a motor vehicle the body of which includes a plurality of doors, a plurality of openings for the doors, at least one sill plate being located in the region of one of said openings of the doors and supporting sheet metal. At least one hydraulic medium supply circuit serves to circulate a hydraulic medium. At least one sensor is designed and arranged to at least sense dynamic torsion of the body. At least one torsion stabilizer unit has a first end and a second end, the first end being operatively connected to the sill plate to form a first connection location and the second end being operatively connected to the supporting sheet metal to form a second connection location. The torsion stabilizer unit includes a flexible hose actuator unit having a diameter, an interior, and a length and being operatively located between the first and second connection locations. At least one control unit is designed and arranged to actively control the hose actuator unit in response to a signal of the sensor to counteract sensed torsion by controlling the volume of the hydraulic medium in the interior of the hose actuator unit. During increase of hydraulic medium in the interior of the hose actuator unit, the diameter of the hose actuator unit expands and the length of the hose actuator unit is shortened. During decrease of hydraulic medium in the interior of the hose actuator unit, the diameter of the hose actuator unit contracts and the length of said hose actuator unit is lengthened.

The novel motor vehicle includes torsion stabilizer units being designed and arranged to suppress dynamic torsion as well as static torsion of the body of the motor vehicle.

The torsion stabilizer units include hydraulic actuator units. Hydraulic actuator units are capable of attaining greater variations in length of the torsion stabilizer units compared to known piezo elements. In this way, it is possible to actively suppress the range of static torsion in the novel motor vehicle. At the same time, the typical frequency range of dynamic torsion vibrations of between approximately 10 to 20 Hz may be well handled with hydraulic actuators.

Not all hydraulic actuators have the same results when being used in the novel motor vehicle. Conventional hydraulic cylinders only effect comparatively low forces between their connection locations compared to the pressure of the used hydraulic medium and to their effective diameter. These conditions are significantly improved in the case of hydraulic hose actuator units or flexible tube actuator units. The hydraulic hose actuator units, in the case of their interior being loaded or filled, respectively, with hydraulic medium, expand with respect to their diameter and—at the same time—their length between the connecting locations is shortened. The force occurring between the connection locations multiplies by approximately five when such hose actuators are used instead of conventional hydraulic cylinders. Consequently, it is especially preferred to use hose actuators in the novel motor vehicle. Surprisingly, it has been found that the lack of compression stability and also the lack of bending stability of hydraulic hose actuators does not have a negative effect when being used in the novel motor vehicle according to the present invention. It is possible without problem to load the host actuators with hydraulic medium in the base condition of the motor vehicle such that pulling tension between the connecting locations of the hose actuator is realized. The pulling tension may then be reduced or increased to actively suppress torsion in the static region and in the dynamic region without leaving the pretension region in its first direction or in its other direction.

The hydraulic actuators in the novel motor vehicle in their mounted position may be designed and arranged to control variations in length between their connecting locations—meaning the locations where the ends of the hose actuators are fixedly connected to the body of the motor vehicle—of a total of more than approximately 0.8 millimeters. This value is drastically more than the change in length which is attainable with known piezo elements. The change in length being attainable with known piezo elements is in a range of less than approximately $\frac{1}{10}$ of a millimeter. Typically, hydraulic hose actuators having a length of approximately 5 to 20 centimeters, and a diameter of some centimeters, are suitable to be applied in the novel motor vehicle. There is no problem to arrange such hose actuators in the motor vehicle.

Preferably, a hydraulic medium supply circuit, servo valves, and locking valves are associated with the hydraulic actuators. A hydraulic medium supply circuit is to be understood as a system of hydraulic medium supply conduits in which the hydraulic medium is substantially transported in circulation. For example, the hydraulic medium may be cooled, and it may also be used to cool the hydraulic actuators and the valves. The servo valves serve to subject or load the hydraulic actuators with the necessary volume of hydraulic medium. The locking valves serve to preserve certain filling conditions of the hydraulic medium in the hydraulic actuators, for example, when the motor vehicle is parked. Preserving certain filling conditions is especially important to prevent torsion of the motor vehicle being parked on a rough supporting surface and to maintain this torsion-free position by using the hydraulic actuator units.

The control unit for the torsion stabilizer units in the novel motor vehicle at least includes a sensor being designed and arranged to watch and to sense dynamic torsion of the body of the motor vehicle. The mentioned sensor or an additional sensor may be designed and arranged to also observe static torsion of the body of the motor vehicle, and to counteract the static torsion. For example, an expansion sensor being located at a transverse sheet metal of the body in front of the trunk of the motor vehicle is a sensor which is suitable to fulfill both aforementioned tasks. The location of the transverse sheet metal of the body in front of the trunk is especially suitable since such transverse sheet metal is part of most available convertibles, and it significantly indicates all torsion prevailing in the body of the convertible.

Furthermore, a bending sensor may be associated with the control unit, the bending sensor observing deflection of the body of the motor vehicle. The possible static and dynamic variations in length of the torsion stabilizers including the hydraulic actuators are great enough to counteract deflection and bending vibrations of the body in addition to torsion control. This is even the case when the novel active torsion stabilizer units of the novel motor vehicle are located at the same place as conventional passive torsion stabilizers in known convertibles.

To record interferences exciting the dynamic torsion vibrations and also the bending vibrations, acceleration sensors being arranged at the two steering stubs may be associated with the control unit. The acceleration sensors are designed and arranged to observe accelerations in a vertical direction. In this way, unevenness or roughness of the road is sensed. The acceleration sensors being located at the steering stubs may be combined with additional acceleration sensors being located at the rear axle stubs. However, it is also possible to combine the first (front) acceleration sensors with an already existing acceleration sensor of the motor vehicle. The velocity sensed by the already existing acceleration sensor of the motor vehicle allows for approximately predicting when interferences will occur at the front axle as well as at the rear axle.

Furthermore, at least one condition sensor preferably is associated with the control unit, the condition sensor being designed and arranged to sense the presently prevailing operation condition of the motor vehicle. For example, the operation condition includes the present load of the motor vehicle and the condition of the top—meaning whether the top is opened or closed. The operation condition of the motor vehicle has a substantial influence on how interferences have the potential of causing torsion vibrations or torsion of the body of the motor vehicle, and also on how torsion and torsion vibrations, respectively, may be effectively counteracted.

Other features and advantages of the present invention will become apparent to one with skill in the art upon examination of the following drawing and the detailed description. It is intended that all such additional features and advantages be included herein within the scope of the present invention, as defined by the claims.

BRIEF DESCRIPTION OF THE DRAWINGS

The invention can be better understood with reference to the following drawings. The components in the drawings are not necessarily to scale, emphasis instead being placed upon clearly illustrating the principles of the present invention. In the drawings, like reference numerals designate corresponding parts throughout the several views.

DETAILED DESCRIPTION

Figure 1:
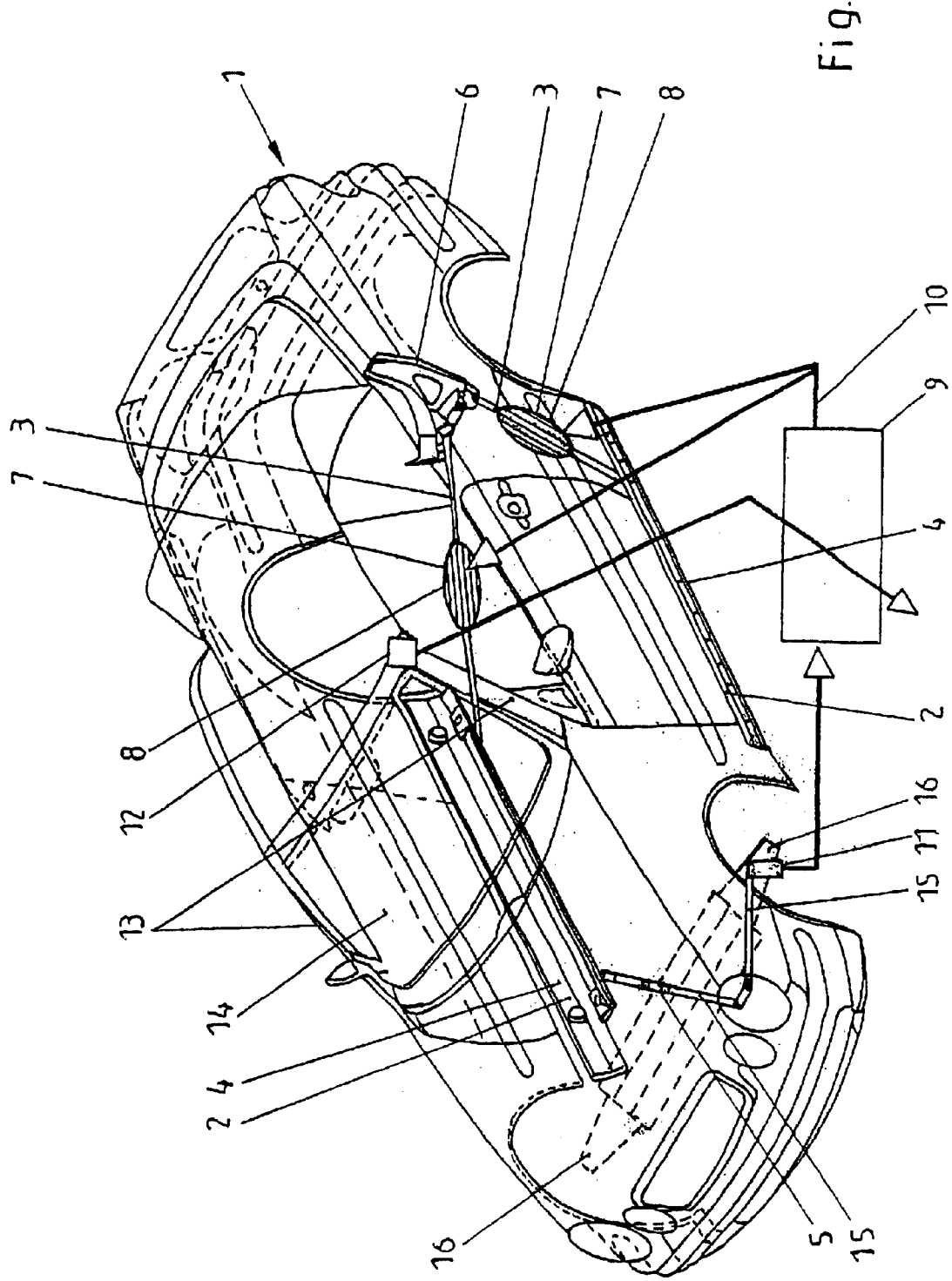
FIG. 1 is a view of the body of a novel convertible including a novel torsion stabilizer unit.

Referring now in greater detail to the drawing, FIG. 1 illustrates a body of a convertible 1. The convertible 1 does not include a fixed top. In conventional motor vehicles, the fixed top results in a stiffening effect of the body against torsion about the longitudinal axis and against deflections about a transverse axis being located in the region of the openings of the doors of the vehicle. To compensate the missing top in the convertible 1, bending stabilizer units 2 and torsion stabilizer units 3 and 15 are arranged at the body. The bending stabilizers 2 are designed as enforced sill plates 4 being located below the openings of the doors. The front torsion stabilizer units 15 are designed as passive enforcing struts 5 at one side contacting the sill plates 4, and at the other side—meaning the front side—contacting supporting locations. The supporting locations are not illustrated in detail since the design of the supporting locations is of no great interest to the present invention. The torsion stabilizers 3 being located in the rear portion of the body 1 also engage the sill plates 4 at one side. At their side facing towards the rear, the torsion stabilizers 3 are connected to supporting sheet metal 6. The rear torsion stabilizers 3 are not designed as compression-proof and deflection-proof struts. Instead, at part of their longitudinal extension, they include hydraulic actuator units 7 being designed as hose actuator units 8. The hose actuator units 8 neither have substantial compression stiffness nor substantial bending stiffness.

In the base condition of the respective motor vehicle, the hose actuators 8 are filled and subjected, respectively, with hydraulic medium 10 by a control unit 9 in a way that average tension is caused to prevail between the connecting locations at the sill plate 4 and at the supporting sheet metal 6. To prevent torsion of the body of the convertible 1, this average tension is partly reduced or partly increased to compensate forces acting upon the body. It is taken into account that the tension caused by the hose actuators 8 preferably is never reduced to reach 0. In this way, variations in length of the rear torsion stabilizers 3 in a range of approximately 1 mm are realized to effectively prevent torsion of the body in the dynamic range as well as in the static range. The hose actuators 8 are controlled with the hydraulic medium 10 by the control unit 9 in response to acceleration sensors 11 sensing an interference signal in the region of the axle stops 16 in a vertical direction. Typically, acceleration sensors 11 are located in the region of the axle stubs 16 of all four or more wheels of the car or of the truck. Furthermore, a sensor 12 being located in the region of the upper end of the A-column 13 and at the upper edge of the windshield 14, respectively, sends remaining transverse vibrations of the body as a return signal. In this way, only torsions in the dynamic range are controllable. An additional sensor, for example an expanding sensor being located at sheet metal of the body being subjected by torsion, is then required. This sensor may also replace the sensor 12.

A vehicle including the body according to FIG. 1 may be even park on a rough surface without torsion of the body due to suitable loading conditions of the hose actuator units 8 with hydraulic medium. The load of the hose actuators 8 may be preserved by locking valves in a way that undesired torsion also does not occur during the period between the vehicle being parked and the vehicle being set in motion again. The locking valves may be conventional ones having a design well known in the art. Since they are not essential for understanding the invention, they are not illustrated herein.

Many variations and modifications may be made to the preferred embodiments of the invention without departing substantially from the spirit and principles of the invention. All such modifications and variations are intended to be included herein within the scope of the present invention, as defined by the following claims.

We claim:

1. A motor vehicle, comprising:
   at least one torsion stabilizer unit having a length and including at least one hydraulic actuator unit, said at least one torsion stabilizer unit being located between at least two connection locations of said motor vehicle, said at least one hydraulic actuator unit being designed and arranged to realize pulling pre-tension between the connecting locations; and
   at least one control unit being designed and arranged to actively control the length of said at least one torsion stabilizer unit in a way that the pulling pre-tension is reduced or increased to actively suppress torsion.

2. The motor vehicle of claim 1, wherein said at least one hydraulic actuator unit is designed as a hose actuator unit having a diameter, an interior, and a length, said at least one hydraulic actuator unit being located between at least two connection locations and being designed and arranged to expand with respect to its diameter and to shorten with respect to its length between the at least one connecting locations when its interior is filled with a hydraulic medium.

3. The motor vehicle of claim 1, wherein said at least one hydraulic actuator unit has a length, is located between at least two connection locations, and is designed and arranged to be controlled by said at least one control unit to change its length between the at least two connection locations by more than approximately 0.8 mm.

4. The motor vehicle of claim 2, wherein said hose actuator unit is designed and arranged to be controlled by said at least one control unit to change its length between the at least two connection locations by more than approximately 0.8 mm.

5. The motor vehicle of claim 1, further comprising a hydraulic medium supply circuit, at least one servo valve, and at least one locking valve being associated with said at least one hydraulic actuator unit.

6. The motor vehicle of claim 2, further comprising a hydraulic medium supply circuit, at least one servo valve, and at least one locking valve being associated with said hose actuator unit.

7. The motor vehicle of claim 3, further comprising a hydraulic medium supply circuit, at least one servo valve, and at least one locking valve being associated with said hydraulic actuator unit.

8. The motor vehicle of claim 4, further comprising a hydraulic medium supply circuit, at least one servo valve, and at least one locking valve being associated with said hose actuator unit.

9. The motor vehicle of claim 1, further comprising a body and at least one sensor being associated with said at least one control unit and being designed and arranged to observe and sense dynamic torsion of said body of said motor vehicle.

10. The motor vehicle of claim 2, further comprising a body and at least one sensor being associated with said at least one control unit and being designed and arranged to observe and sense dynamic torsion of said body of said motor vehicle.

11. The motor vehicle of claim 3, further comprising a body and at least one sensor being associated with said at least one control unit and being designed and arranged to observe and sense dynamic torsion of said body of said motor vehicle.

12. The motor vehicle of claim 4, further comprising a body and at least one sensor being associated with said at least one control unit and being designed and arranged to observe and sense dynamic torsion of said body of said motor vehicle.

13. The motor vehicle of claim 5, further comprising a body and at least one sensor being associated with said at least one control unit and being designed and arranged to observe and sense dynamic torsion of said body of said motor vehicle.

14. The motor vehicle of claim 6, further comprising a body and at least one sensor being associated with said at least one control unit and being designed and arranged to observe and sense dynamic torsion of said body of said motor vehicle.

15. The motor vehicle of claim 7, further comprising a body and at least one sensor being associated with said at least one control unit and being designed and arranged to observe and sense dynamic torsion of said body of said motor vehicle.

16. The motor vehicle of claim 8, further comprising a body and at least one sensor being associated with said at least one control unit and being designed and arranged to observe and sense dynamic torsion of said body of said motor vehicle.

17. The motor vehicle of claim 9, further comprising a second sensor associated with said at least one control unit and being designed and arranged to observe and sense static torsion of said body of said motor vehicle.

18. The motor vehicle of claim 17, wherein said body of said motor vehicle includes transverse sheet metal and a trunk, said transverse sheet metal being located in front of said trunk, and wherein said second sensor is designed as an expansion sensor being located at said transverse sheet metal to observe and sense static and dynamic torsion of said body.

19. The motor vehicle of claim 9, further comprising a deflection sensor being associated with said at least one control unit and being designed and arranged to observe and sense deflection of said body of said motor vehicle.

20. The motor vehicle of claim 17, further comprising a deflection sensor being associated with said at least one control unit and being designed and arranged to observe and sense deflection of said body of said motor vehicle.

21. The motor vehicle of claim 18, further comprising a deflection sensor being associated with said at least one control unit and being designed and arranged to observe and sense deflection of said body of said motor vehicle.

22. The motor vehicle of claim 9, further comprising two front axle stubs and at least two acceleration sensors, one of said at least two acceleration sensors being located at one of said front axle stubs and being designed and arranged to observe and sense acceleration in a vertical direction.

23. The motor vehicle of claim 17, further comprising two front axle stubs and at least two acceleration sensors, one of said at least two acceleration sensors being located at one of said front axle stubs and being designed and arranged to observe and sense acceleration in a vertical direction.

24. The motor vehicle of claim 19, further comprising two front axle stubs and at least two acceleration sensors, one of said at least two acceleration sensors being located at one of said front axle stubs and being designed and arranged to observe and sense acceleration in a vertical direction.

25. The motor vehicle of claim 9, further comprising at least one condition sensor being associated with said at least one control unit and being designed and arranged to observe and sense the operating condition of said motor vehicle.

26. The motor vehicle of claim 17, further comprising at least one condition sensor being associated with said at least one control unit and being designed and arranged to observe and sense the operating condition of said motor vehicle.

27. The motor vehicle of claim 19, further comprising at least one condition sensor being associated with said at least one control unit and being designed and arranged to observe and sense the operating condition of said motor vehicle.

28. The motor vehicle of claim 22, further comprising at least one condition sensor being associated with said at least one control unit and being designed and arranged to observe and sense the operating condition of said motor vehicle.

29. The motor vehicle of claim 1, wherein said motor vehicle is a convertible.

30. A convertible, comprising:
a body including a plurality of doors, a plurality of openings for said doors, at least one sill plate being located in the region of one of said openings of said doors and supporting sheet metal;
at least one hydraulic medium supply circuit for circulation of a hydraulic medium;
at least one sensor being designed and arranged to at least sense dynamic torsion of said body;
at least one torsion stabilizer unit having a first end and a second end, said first end being operatively connected to said sill plate to form a first connection location and said second end being operatively connected to said supporting sheet metal to form a second connection location, said torsion stabilizer unit including a flexible hose actuator unit having a diameter, an interior, and a length and being operatively located between said first and second connection locations, said flexible hose actuator unit being designed and arranged to realize pulling pre-tension between the connecting locations; and
at least one control unit being designed and arranged to actively control said hose actuator unit in response to a signal of said sensor to counteract sensed torsion by controlling the volume of the hydraulic medium in the interior of said hose actuator unit in a way that
during increase of hydraulic medium in the interior of said hose actuator unit the diameter of said hose actuator unit expands and the length of said hose actuator unit is shortened such that the pulling pre-tension is increased, and that
during decrease of hydraulic medium in the interior of said hose actuator unit the diameter of said hose actuator unit contracts and the length of said hose actuator unit is lengthened such that the pulling pre-tension is reduced.

* * * * *

UNITED STATES PATENT AND TRADEMARK OFFICE
CERTIFICATE OF CORRECTION

PATENT NO. : 6,764,086 B2  
APPLICATION NO. : 10/055250  
DATED : July 20, 2004  
INVENTOR(S) : Gnauert et al.

It is certified that error appears in the above-identified patent and that said Letters Patent is hereby corrected as shown below:

On Title page, Item (73) Assignees: Insert

Wilhelm Karmann GmbH

ERAS Entwicklung und Realisation adaptiver Systeme GmbH

Signed and Sealed this

Twenty-ninth Day of July, 2008

JON W. DUDAS  
*Director of the United States Patent and Trademark Office*